Patented Apr. 7, 1953

2,634,202

UNITED STATES PATENT OFFICE 2,634,202

HERBICIDES

John K. Fincke, Dayton, Ohio, assignor to Monsanto Chemical Company, St. Louis, Mo., a corporation of Delaware No Drawing. Application April 25, 1950, Serial No. 158,076

8 Claims. (Cl. 71—2.7)

The present invention relates to herbicides and deals more particularly with methods for the general destruction of undesired plants.

A number of herbicides are known, a variety of organic and inorganic compounds having been suggested in prior art for use as plant-killers. Among the disadvantages of prior herbicides may be mentioned corrosive effect on equipment, water-insolubility (and hence the necessity of flammable or obnoxious spray media), chemical reactivity with other components customarily employed in agricultural sprays or powders, instability when exposed for long periods of time to ordinary atmospheric conditions, and soil instability, e. g., chemical reactivity with soil components and susceptibility to decomposition by soil microorganisms, which results in loss of the active material. Thus, a herbicide possessing a free carboxy group may be substantially deactivated in highly alkaline soil by reaction with basic, salt-forming materials contained in such soils. Conversely, a herbicide having reactive basic substituents may be deactivated by reaction with acid constituents of acidic soils.

Now I have found that sulfones having the general formula

RSCH:CH$_2$
O$_2$ in which R is a member of the group consisting of alkyl radicals of from 1 to 12 carbon atoms and the vinyl radical, are highly stable, non-corrosive, water-soluble herbicides of unusually good plant-killing efficiency.

As illustrative of compounds having the above general formula may be mentioned vinyl sulfone, ethyl vinyl sulfone, n-hexyl vinyl sulfone, tert.-dodecyl vinyl sulfone, etc.

The present sulfones are effective herbicides over wide ranges of concentrations. Their effect may be measured by determining the inhibition of root growth as compared to similar untreated plants. The general technique of evaluation of herbicides by growing seedlings in Petri dishes has been described by Thompson, Swanson and Norman, Botanical Gazette, 107, 476–507 (1946).

The present herbicides are readily available compounds being easily prepared by a variety of methods, e. g., as described in the Schoene U. S. Patent No. 2,474,808.

The present invention is further illustrated, but not limited, by the following example:

Example

Herbicidal activity of the compounds listed in the table below was determined by germination of cucumber seeds for 4 days at a temperature of 76° F. in the presence of aqueous solutions of each of the indicated chemicals at concentrations of 100 P. P. M. Seventy-five seeds were used for each test. The results are expressed as percent length of the primary roots in the presence of the chemical compared with the length of the primary roots of controls which had been germinated in water. The activity of a number of standard herbicides as obtained by the same test are included for comparison.

| Compound Tested | Percent Growth at 100 Parts Per Million |
| --- | --- |
| 2,4-dichlorophenoxyacetic acid | 6 |
| Isopropyl carbanilate | 8 |
| Vinyl sulfone | 2 |
| Methyl vinyl sulfone | 3 |
| n-Octyl vinyl sulfone | 12 |
| Chlorinated polyvinyl sulfone | 113 |
| β-Phenethyl vinyl sulfone | 98 |
| Allyl sulfone | 76 |

The herbicidal properties of the present sulfones is rather surprising, because as shown in the table given above, all sulfones containing the vinyl radical do not possess great herbicidal efficiency.

The present sulfones are preferably applied to plants by spraying them with aqueous solutions of the same, this method offering an easy and inexpensive way of destroying plant growth. However, the present sulfones are likewise effective when applied in agricultural dusts; or they may be used with water-insoluble insecticides, fungicides, etc., in customarily employed organic solutions. Herbicidal dusts may be prepared by mixing the sulfones with dusting materials such as talc, clay, lime, bentonite, pumice, fuller's earth, etc.

Aqueous solutions of the present sulfones may be used to destroy already existing plant growth by direct application to the undesirable plants, or they may be employed to prevent the plant growth by application to soils. When employed to prevent plant growth, for example in parking areas, highway abutments, railway yards, etc., the present vinyl sulfones may be applied either as aqueous sprays or as dusts or they may be admixed with customarily employed temporary surfacing materials, e. g., oils, cinders, etc. The present invention thus provides a generally useful method of preventing and destroying undesirable plant growth.

Only small amounts of the present herbicidal materials need be employed. For general utility, concentrations of from, say, 500 parts to 5 parts of the sulfone per million parts by weight of the carrier may be employed, and in this manner an acre of land may be freed of plants by application of only a few grams of one of the present herbicides.

What I claim is:

1. A method for destroying undesired plants which comprises applying to said plants a lethal quantity of a herbicidal composition comprising a sulfone having the general formula

in which R is a member of the group consisting of alkyl radicals of from 1 to 12 carbon atoms and the vinyl radical.

2. A method for destroying undesired plants which comprises applying to said plants a lethal quantity of an aqueous solution comprising a sulfone having the general formula

in which R is a member of the group consisting of alkyl radicals of from 1 to 12 carbon atoms and the vinyl radical.

3. A method for destroying undesired plants which comprises applying to said plants a lethal quantity of an aqueous solution comprising a sulfone having the general formula

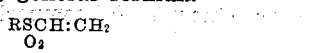

in which R is a member of the group consisting of alkyl radicals of from 1 to 12 carbon atoms and the vinyl radical, the concentration of said sulfone in said solution being from 500 parts to 5 parts per million parts by weight of water.

4. A method of destroying undesired plants which comprises applying to said plants a lethal quantity of a herbicidal composition comprising vinyl sulfone.

5. A method for destroying undesired plants which comprises applying to said plants a lethal quantity of a herbicidal composition comprising methyl vinyl sulfone.

6. A method for destroying undesired plants which comprises applying to said plants a lethal quantity of a herbicidal composition comprising n-octyl vinyl sulfone.

7. A method of destroying undesired plants which comprises applying to said plants a lethal quantity of a herbicidal composition comprising an alkyl vinyl sulfone in which the alkyl radical has from 1 to 12 carbon atoms.

8. A herbicidal composition including a fluent carrier and containing as an active ingredient an alkyl vinyl sulfone in which the alkyl radical has from 1 to 12 carbon atoms.

JOHN K. FINCKE.

REFERENCES CITED

The following references are of record in the file of this patent:

UNITED STATES PATENTS

| Number | Name | Date |
|---|---|---|
| 2,103,879 | Ufer | Dec. 28, 1937 |
| 2,140,608 | Ufer | Dec. 20, 1938 |

OTHER REFERENCES

Botanical Gazette, vol. 107, pages 476 to 507 (1946).